United States Patent
Henuset et al.

(10) Patent No.: US 6,814,840 B2
(45) Date of Patent: Nov. 9, 2004

(54) FLOW-THROUGH ELECTROCHEMICAL REACTOR FOR WASTEWATER TREATMENT

(75) Inventors: Yves Michel Henuset, Montreal (CA); Joel Fournier, Montreal (CA)

(73) Assignee: National Research Council of Canada, Ottawa (CA)

( * ) Notice: Subject to any disclaimer, the term of this patent is extended or adjusted under 35 U.S.C. 154(b) by 385 days.

(21) Appl. No.: 09/782,279

(22) Filed: Feb. 14, 2001

(65) Prior Publication Data

US 2002/0153245 A1 Oct. 24, 2002

(51) Int. Cl.[7] .............................. C25D 17/00; C02F 1/46
(52) U.S. Cl. .................... 204/242; 267/275.1; 267/284; 267/290.12; 267/674
(58) Field of Search ................................ 204/242, 267, 204/275.1, 284, 290.12, 674

(56) References Cited

U.S. PATENT DOCUMENTS

| | | | |
|---|---|---|---|
| 3,664,951 A | 5/1972 | Armstrong | 210/44 |
| 4,014,766 A | 3/1977 | Watanabe et al. | 204/152 |
| 4,113,615 A | 9/1978 | Gorbaty | 210/40 |
| 4,164,469 A | 8/1979 | Wagner | 210/40 |
| 4,339,324 A * | 7/1982 | Haas | 204/270 |
| 4,445,990 A * | 5/1984 | Kim et al. | 204/294 |
| 4,473,449 A | 9/1984 | Michaels et al. | 204/101 |
| 4,652,355 A | 3/1987 | Noding | 204/252 |
| 4,689,124 A | 8/1987 | Noding | 204/78 |
| 4,705,564 A | 11/1987 | Noding | 75/120 |
| 4,839,007 A | 6/1989 | Kotz et al. | 204/149 |
| 5,364,509 A | 11/1994 | Dietrich | 204/149 |
| 5,399,247 A | 3/1995 | Carey et al. | 204/131 |
| 5,531,865 A | 7/1996 | Cole | 205/751 |
| 5,549,812 A | 8/1996 | Witt a.k.a. Witte | 205/744 |
| 5,587,057 A | 12/1996 | Metzler et al. | 204/228 |
| 5,611,907 A | 3/1997 | Herbst et al. | 205/742 |
| 5,662,789 A | 9/1997 | MacDougall et al. | 205/688 |
| 5,705,050 A | 1/1998 | Sampson et al. | 205/687 |
| 5,746,904 A | 5/1998 | Lee | 205/757 |
| 5,879,555 A | 3/1999 | Khudenko | 210/615 |
| 5,928,493 A | 7/1999 | Morkovsky et al. | 205/757 |
| 6,071,409 A | 6/2000 | Bondy et al. | 210/634 |
| 6,126,838 A | 10/2000 | Huang et al. | 210/712 |
| 6,174,444 B1 | 1/2001 | Smit | 210/709 |
| 6,328,875 B1 * | 12/2001 | Zappi et al. | 205/500 |
| 6,342,150 B1 * | 1/2002 | Sale et al. | 205/688 |

FOREIGN PATENT DOCUMENTS

| | | |
|---|---|---|
| CA | 1162514 | 2/1984 |
| CA | 1166603 | 5/1984 |
| CA | 1230080 | 12/1987 |
| CA | 2124616 | 12/1994 |
| CA | 2187739 | 4/1995 |
| JP | 53057177 | 5/1978 |

* cited by examiner

Primary Examiner—Roy King
Assistant Examiner—William T. Leader
(74) Attorney, Agent, or Firm—Marks & Clerk

(57) ABSTRACT

Disclosed is A flow-through electrochemical reactor comprising a body having an internal chamber, and an inlet port and an outlet port in communication with said internal chamber to permit flow of wastewater therethrough, at least one porous anode arranged in said internal chamber such that the wastewater flowing between said inlet port and said outlet port flows through the pores of said at least one porous anode, said at least one porous anode having activity for the destruction of a target substance, and at least one cathode disposed in the internal chamber to permit an electric current to be established between said at least one cathode and said at least one anode, said electric current reducing the concentration of said target substance in the wastewater flowing through the chamber.

12 Claims, 7 Drawing Sheets

FLOW-THROUGH ELECTROCHEMICAL REACTOR FOR WASTEWATER TREATMENT

FIELD OF THE INVENTION

This invention relates to wastewater treatment where levels of organic contaminants, such as phenols and related compounds, are to be decreased.

BACKGROUND OF THE INVENTION

Several industrial processes require the use of large quantities of water for their operations. The water may come from natural sources such as rivers or from treated city water. As a consequence of the industrial activities, the used water may become contaminated with organic pollutants beyond permissible, environmentally acceptable limits.

Organic contaminants can be removed to a limited degree by adsorption on activated carbon, ozonation, or a combination of these methods. After use, activated carbon, if filled with contaminants, requires destruction or disposal to a special landfill. In addition, activated carbon is not necessarily selective enough to efficiently absorb the problem compounds, and when the active sites are full, the adsorption capacity goes down to zero. Ozone is a dangerous chemical and it would be preferred if its use could be avoided in wastewater treatment.

Electrochemical treatment of wastewater can reduce the level of organic contaminants by oxidation. Noding (U.S. Pat. No. 4,652,355) discloses an electrochemical reactor in which the anode and cathode in a reaction chamber are in the same plane as the direction of flow of aryl-containing wastewater. This reactor predominantly produces aryl hydroquinones, which are not ideal end products for environmental release.

Similarly, Cole (U.S. Pat. No. 5,531,865) discloses an electrochemical reactor having a cathode and a plurality of sacrificial anodes elongated in a chamber, parallel to the direction of flow of contaminated water. With such a configuration of electrodes, charge density will vary across the cross-section of the reaction chamber, and it is possible that a significant amount of aryl compounds will not contact an anode, and experience sufficient charge density to be oxidized, while flowing through the chamber.

Several patents have issued relating to reactors that, in attempting to optimize the possibility of electrochemical reaction, make available significant electrode surface area by having multiple solid electrodes in various configurations and/or requiring meandering flow of wastewater over the surface the electrodes (for example U.S. Pat. Nos. 5,549,812 (Witt); 5,587,057 (Metzler et al.); 5,611,907 (Herbst et al.); 5,746,904 (Lee); and 5,928,493 (Morkovsky et al.)). The reactors found in these patents tend to be of relatively complex construction and the flowpath of the wastewater over solid electrodes, in each case, does not guarantee intimate contact with an anode surface.

Sampson et al. (U.S. Pat. No. 5,705,050) discloses a packed bed reactor, which includes an ion exchange material packed between an anode and a cathode. However, ion exchange materials require special handling and specific reactor conditions to tolerate higher back pressures that can occur.

SUMMARY OF THE INVENTION

By using at least one porous anode, the electrochemical reactor of the present invention addresses limitations in known reactors. By directing the flow of wastewater through the pores of at least one porous anode, the reactor disclosed herein provides a high probability that contaminant molecules will experience intimate contact with an anode and thus encounter the necessary current density for oxidation. This advantage is coupled with the relatively simple construction of the reactor and ease of maintenance.

The invention provides an electrochemical reactor (cell) for reducing the concentration of organic compounds, such as aryl compounds, found in wastewater from industrial processes. Breakdown of the organic compounds occurs by oxidation at the anode of the electrochemical reactor.

More specifically, the present invention provides a flow-through electrochemical reactor comprising:

a body having an internal chamber, and an inlet port and an outlet port in communication with said internal chamber to permit flow of wastewater therethrough;

at least one porous anode arranged in said internal chamber such that the wastewater flowing between said inlet port and said outlet port flows through the pores of said at least one porous anode, said at least one porous anode having activity for the destruction of a target substance; and at least one cathode disposed in the internal chamber to permit an electric current to be established between said at least one cathode and said at least one anode, said electric current reducing the concentration of said target substance in the wastewater flowing through the chamber.

The reactor, when in use, reduces TOC content of industrial wastewater by oxidizing target substances, such as aryl compounds, efficiently. Efficient oxidation minimizes the possibility of competing side reactions. The side reactions are unfavorable since they might produce compounds that are as harmful as, or more harmful than, the compounds to be destroyed.

Thus, the electrochemical reactor can treat a wastewater stream to reduce the concentration of aryl compounds to an environmentally acceptable level. The reactor of the present invention also offers the advantage that it can be installed within an existing piping system.

BRIEF DESCRIPTION OF THE DRAWINGS

Further features of the present invention will become apparent, to those skilled in the art to which the present invention relates, from reading the following specification with reference to the accompanying drawings, in which.

DETAILED DESCRIPTION OF THE INVENTION

The following description illustrates the manner in which the principles of this invention are applied but is not to be construed as, in any sense, limiting the scope of the invention.

Figure 1:
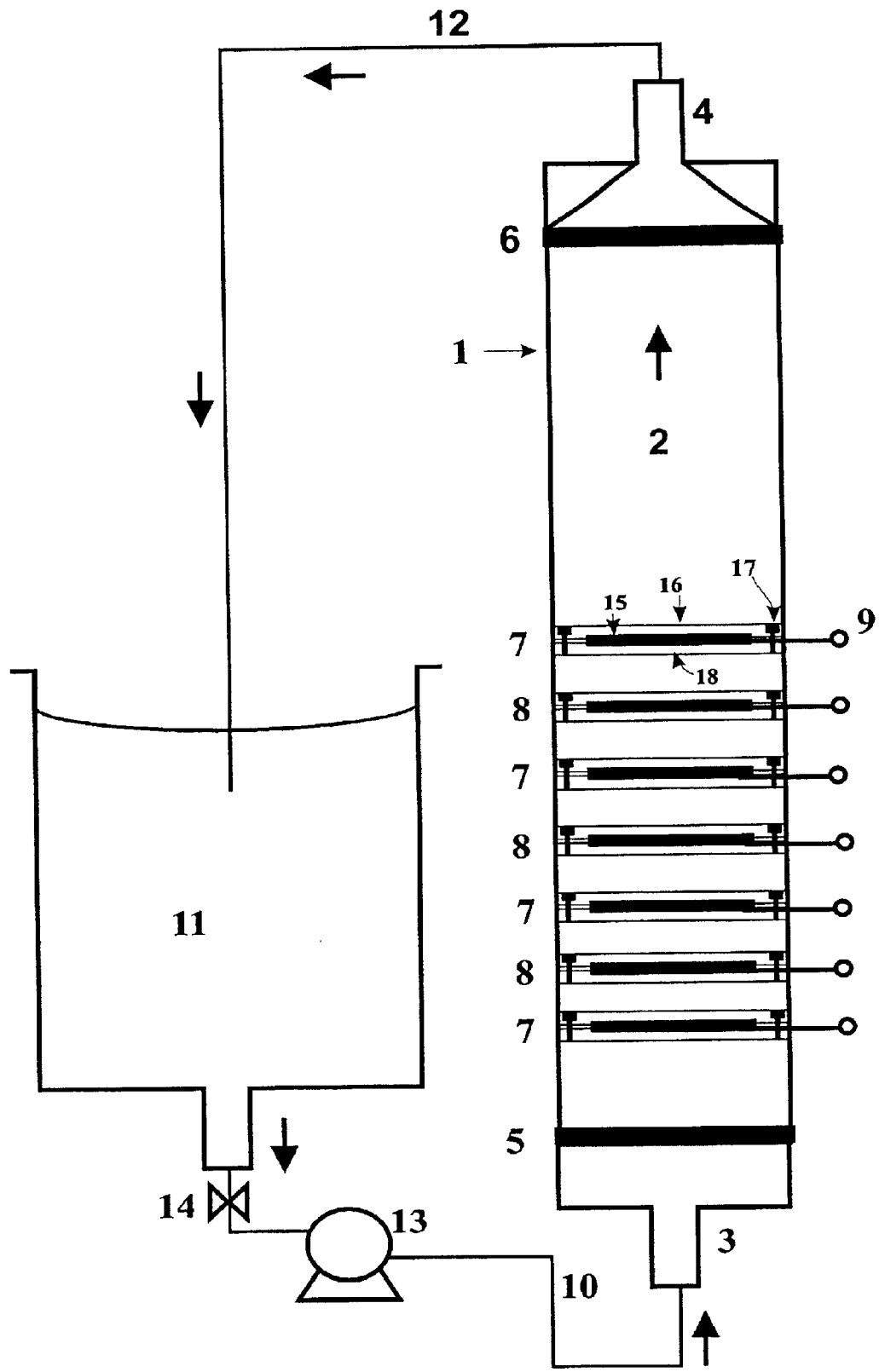
FIG. 1 is a schematic diagram of an embodiment of the flow-through reactor of the present invention.

Referring to the embodiment of FIG. 1, an electrochemical reactor 1 in accordance with the present invention includes a tubular body 2 having an inlet port 3 and an outlet port 4. The inlet port 3 is retained on the tubular body 2 with a first retaining means (not shown). An inlet O-ring 5 is disposed between the inlet port 3 and the tubular body 2 in a sealing engagement. Similarly, the outlet port 4 is retained on the tubular body 2 with a second retaining means (not shown). An outlet O-ring 6 is disposed between the outlet port 4 and the tubular body 2 in a sealing engagement.

Inside the tubular body are a series of porous cathodes 7 and anodes 8 in alternating arrangement, each having a contact wire 9 in the form of a screw passing, in a liquid-tight manner, through holes in the wall of the tubular body 2. The screws also serve to secure the cathodes and anodes in place and are further provided with electrical communication to a DC power supply (not shown). Wastewater is introduced into the reactor through an inlet pipe 10 from a reservoir 11. Treated wastewater leaves the reactor through an outlet pipe 12 and is returned to the reservoir 11. A pump 13 is used to move the wastewater through the reactor. The wastewater supply from the reservoir 11 is controlled by a valve 14.

Figure 2:
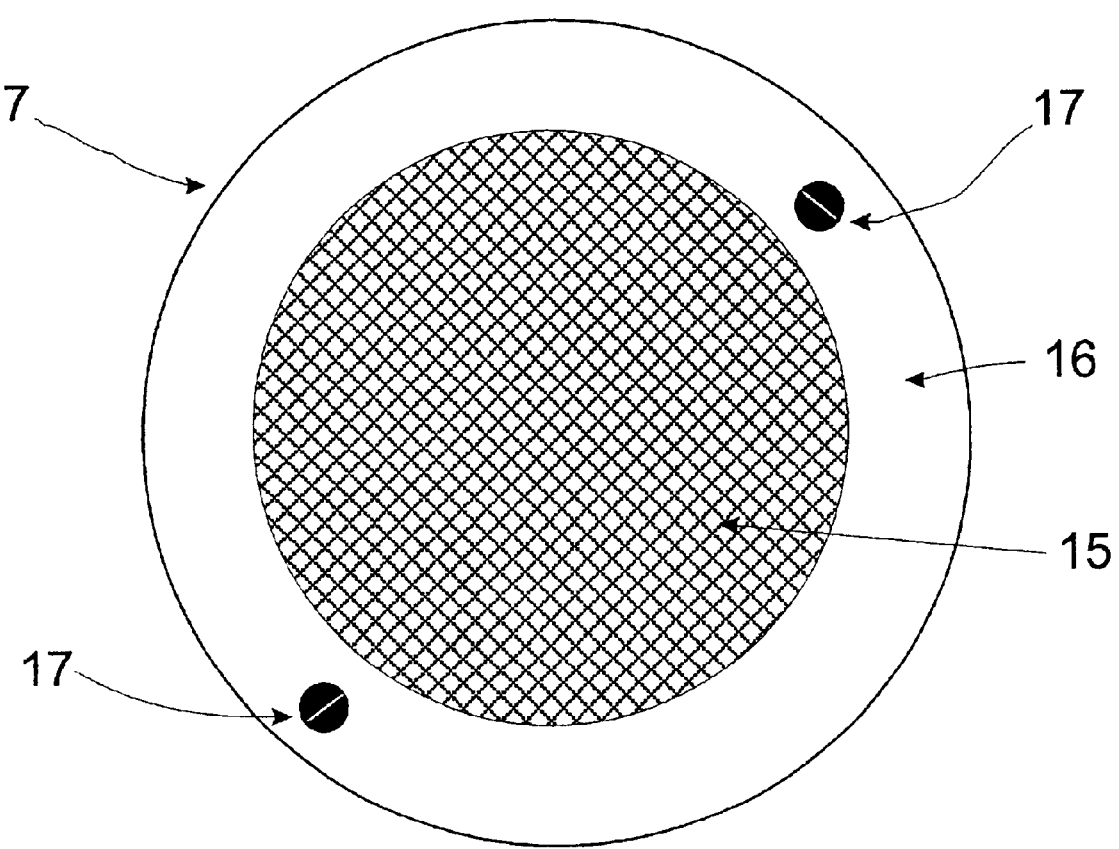
FIG. 2 is a top view of an electrode of FIG. 1.

Referring to FIG. 2, a cathode 7 is shown which includes an circular, 3D foam-type electrode 15 retained in an insulating electrode holder having a top 16 and bottom 18 (see FIG. 1) held together with screws 17. Each electrode holder is sized to provide a snug fit within the tubular body 2 so that essentially all wastewater introduced into the reactor passes through the porous anodes 8 and cathodes 7.

Figure 3:
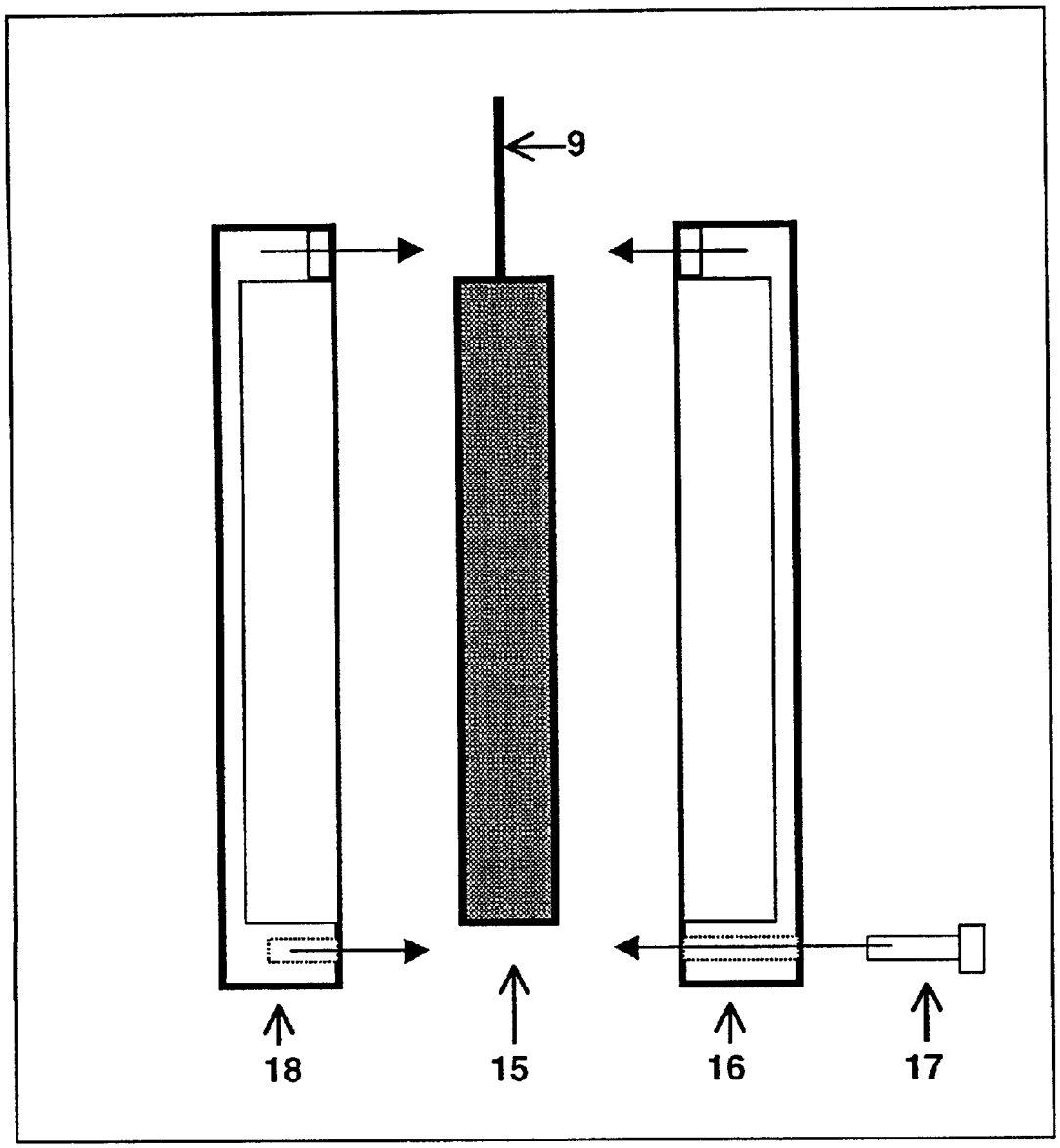
FIG. 3 is a schematic side view of an electrode and holder of FIG. 1.

FIG. 3 shows a foam-type electrode 15 and contact wire 9 between the top 16 and bottom 18 of the electrode holder prior to assembly by screwing the top 16 and bottom 18 together with the screw 17.

In use, the reactor 1 can be mounted vertically or horizontally. The reactor should be placed in an open recirculation circuit, thus allowing evolved gases, such as carbon dioxide, to escape.

The body of the reactor can have a variety of shapes but preferably is tubular and the internal chamber cylindrical, with a generally circular cross-section. While FIG. 1 shows detachable inlet and outlet ports 3 and 4, which permit convenient access to the electrodes in the tubular body 2, a unitary construction is also possible. The electrode holder (see FIG. 3) serves as a mechanical device to install electrodes within the electrochemical reactor 1, as well as an electrical insulator. The insulating holder preferably is sized, conveniently in a disc shape, for close-fitting insertion into the internal chamber. The holders can be held in place within the body 2 by screws passing through the wall of the body, or by some other suitable means. It is preferred that the electrical connection is also provided by the screw which can be connected electrically to a suitable power supply external to the reactor. Conveniently, the power supply is a DC supply.

By removing the inlet port 3 or outlet port 4, or both, the number, and arrangement, of electrodes in the reactor 1 can be conveniently changed. In addition, the electrodes can be removed from the reactor for periodic cleaning. The cleaning process can also be performed in situ and may involve the use of an organic solvent, such as methanol or ethanol, or an alkaline cleaner, with or without current. The current may be inverted if needed. It is preferred that the anode material is platinum and the cathode material is nickel, because a current polarity inversion to clean them will not result in damage to the electrode materials.

The electrodes are preferably stacked in an alternating arrangement, such that an anode is placed next to a cathode and vice-versa (i.e. C/A/C/A/C/A/C/A/C . . . ). As such, the number of anodes and cathodes in the reactor can be varied, from a minimum of one anode and one cathode to many tens of anodes and cathodes. It is preferred that the alternating arrangement begins and ends with a cathode, to ensure optimum activity of the anode at the start and end of the series. More preferably, there are two to ten anodes and three to eleven cathodes, respectively. Conveniently, there are seven cathodes and six anodes. The number of electrodes used depends upon the volume of the solution to be treated and the desired treatment time. Each anode is isolated from each cathode, to avoid a short-circuit. The anodes and cathodes typically are each connected to corresponding bus bars that in turn are connected to a DC power supply.

The reactor is made from any material that has the necessary mechanical strength for the chosen dimensions of the reactor, and resistance to corrosion by the wastewater stream of interest. Such materials can be glass, polymer-coated stainless steel, reinforced fiberglass or polymer, and the like.

Preferably, the wastewater is filtered before treatment in the reactor in order to minimize the possibility of blockage of the electrodes with solid materials. The wastewater to be treated flows through the porous electrodes in the reactor, and therefore the liquid can be treated then conducted to a holding tank. While the solution to be treated flows through the reactor, and hence through the electrodes, a DC current passes within the reactor, between the anodes and the cathodes. The pore openings in the foam electrodes allow a free flow, of the wastewater to be treated, with a minimum of flow restriction.

Depending upon the anode material, a current density that can vary between 0.7 and 70 (mA/cm$^2$) is applied, although for phenolic compounds, a current density of about 1.4 mA/cm$^2$ is preferred. For wastewater having several target compounds, zones of different current densities can be established within the reactor in order to optimize the destruction of each target compound. The distance between certain electrodes can be selected based on the desired current density at a particular location in the reactor.

The electrolysis (or treatment) time depends upon the initial concentration of the problem compounds and the final concentration desired, as well as the flow rate. This latter variable can be between 1 to 60 liters per minute of reactor capacity, although a flow of about 8 liters per minute is preferred. The dimensions of the electrodes, and the reactor generally, can be varied depending on specific requirements. Electrode diameter conveniently can be up to about 1.5 m. Electrode thickness conveniently can be up to 3 cm, preferably about 0.5 cm for a titanium substrate.

The wastewater to be treated can circulate for a variable number of cycles through the reactor, or make a single pass, depending upon the level of initial contamination level and final desired (or required) final level and desired (or required) treatment time. Conveniently, the reactor is used at ambient temperature and pressure, although other conditions can be selected as appropriate.

Wastewater to be treated can come from industrial sources, such as debarking effluent, and pulp and papermaking effluent. Preferred target aryl compounds in such wastewater are phenol and o-, m- and p-cresol. The reactor described herein has the capability of destroying the target compounds even in the presence of other organic compounds, such as butanoic acid, pentanoic acid, hexanoic acid, butanedioic acid, camphor, borneol, linalyl propanoate, furan carboxaldehyde, cyclohexanecarboxylic acid, 2-(2-hydroxy-2-propyl)-5-methyl-cyclohexanol, benzoic acid, 4-hydroxy-benzenepropanoic acid, or inorganic species such as calcium, iron, magnesium, manganese, aluminum, zinc, sodium and potassium.

The total organic carbon (TOC) level of the wastewater to be treated is preferably less than 7500 ppb, more preferably less than 1500 ppb.

The Anode

The anode conveniently should be made from a material that is stable in the wastewater to be treated, and that provides reasonable activity for the destruction of the target compounds. The anode is preferably non-sacrificial.

The anode typically is constituted by a coated substrate, the substrate preferably being a valve metal, such as tantalum or titanium. Although various anode substrates could be used, such as nickel, stainless steel alloys or other corrosion resistant materials, titanium is preferred. The anode substrate should be in the form of a porous or 3D medium (sponge, foam, felt or mesh). A foam-type is preferred, such as the Astro Met® materials (Astro Met, Cincinnati, Ohio), in a configuration similar to that shown in FIGS. 2 and 3. Each anode should have a pore opening value of up to 40 pores per linear inch (ppi), preferably 20 ppi, to allow liquid flow with minimal resistance.

When titanium is used as anode substrate, it is preferably first activated through a process that removes the surface oxide layer. Treating the titanium with boiling concentrated hydrochloric acid is one such process. The treated titanium is then quickly coated with the selected anode material.

The anode is where the electrooxidative processes take place. Destruction of an organic compound by oxidation is a two-fold process:

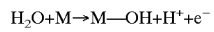 Step 1.

In Step 1, the water molecule is split into hydrogen and hydroxyl radicals. The anode (M) serves as a base to the formation of these two species (it acts as an electrocatalyst). The second step involves the oxidation of an organic compound (R):

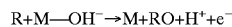 Step 2.

where RO corresponds to the oxidized organic compound.

This overall reaction competes with the reaction that forms oxygen. Electrochemical efficiency is defined as the ratio between the two main anodic reactions.

Anode materials were tested for stability and efficiency to destroy organic contaminants in high TOC wastewater. The results of these tests are summarized in Table 1:

TABLE 1

| Anode Material | Efficiency for Organic Destruction | Electrochemical Stability |
|---|---|---|
| Platinum | Very good | Very good |
| Tantalum doped Iridium Dioxide | Very good | Poor |
| Antimony doped Tin Dioxide | Good | Very good |

Figure 4:
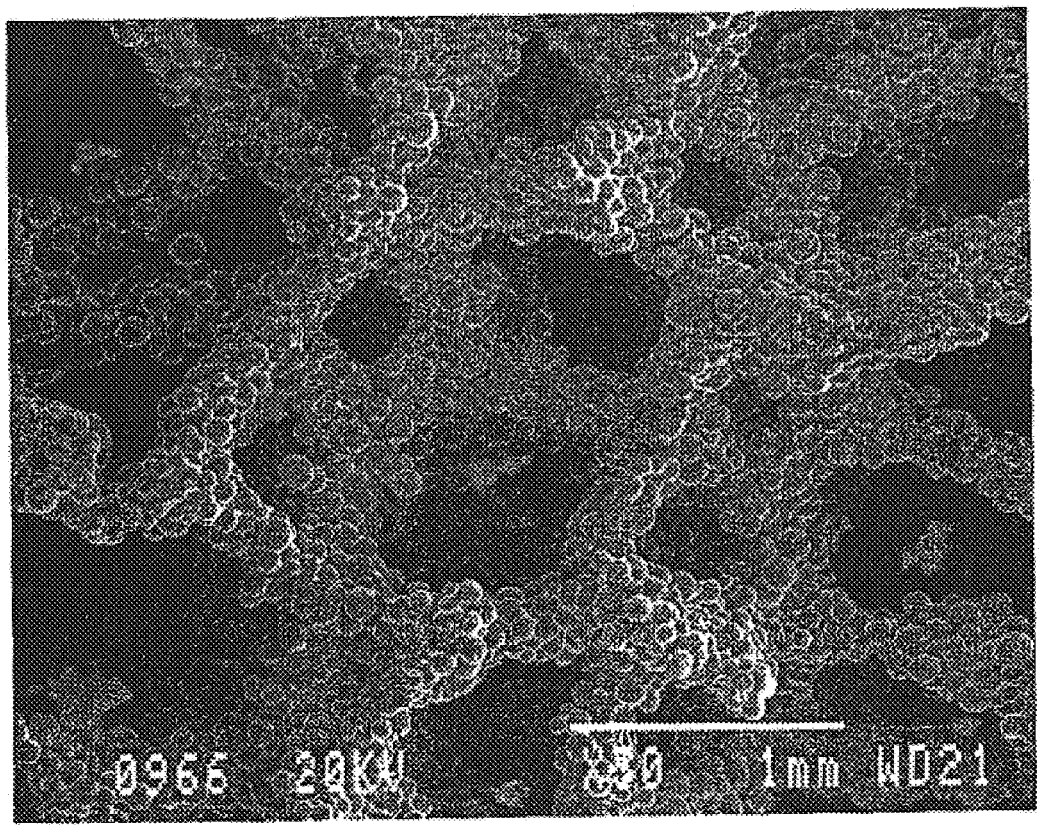
FIG. 4 is an image of a titanium foam used as an anode substrate.
Figure 6:
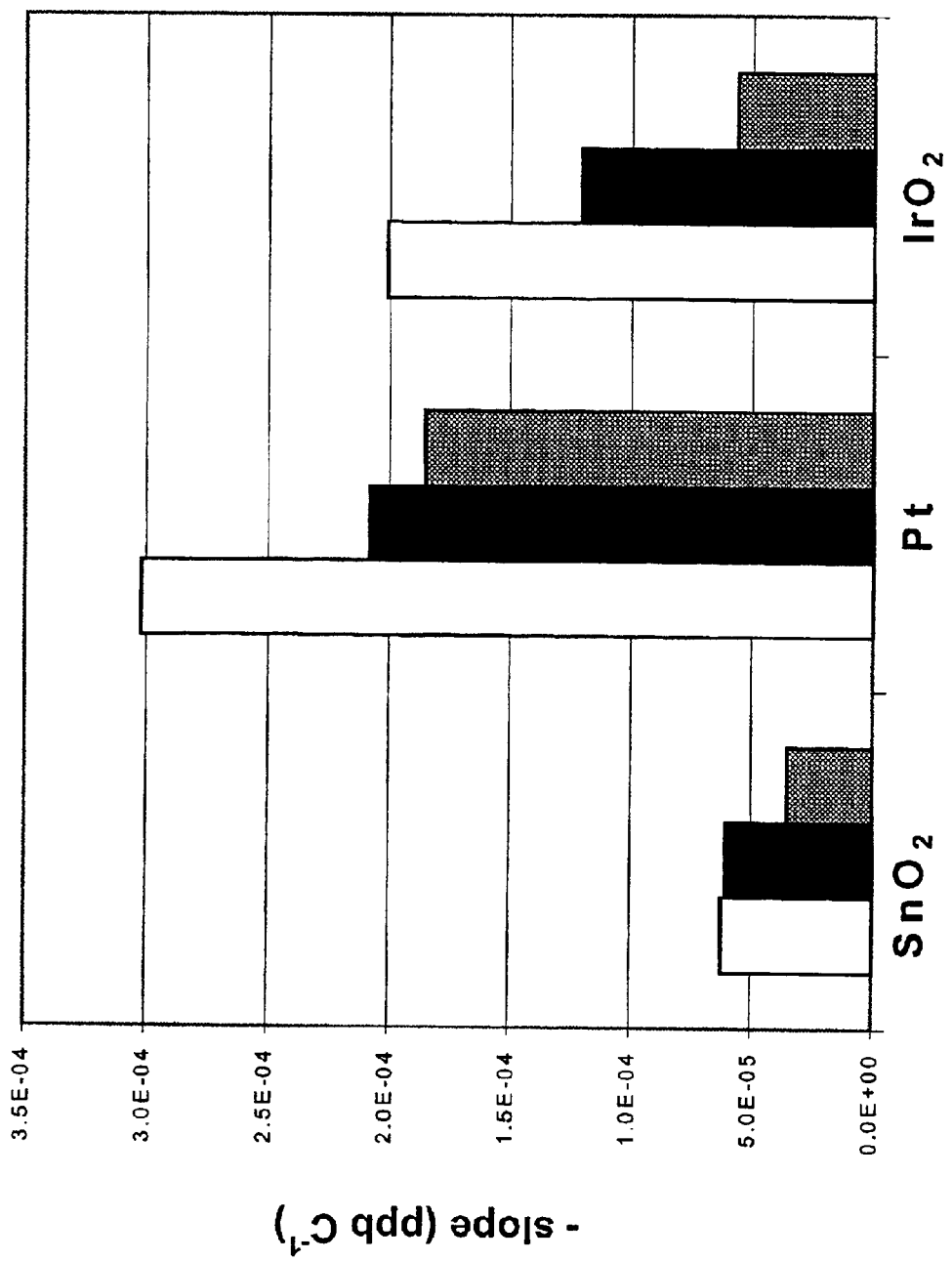
FIG. 6 is a graph of the efficiency of phenol destruction by an embodiment of an electrochemical reactor of the invention, at current densities of 1.4 (white), 2.8 (black) and 5.6 (cross-hatched) $MA/cm^2$, using 3D foam anodes of either antimony-doped tin dioxide, platinum or tantalum-doped iridium dioxide.
Figure 7:
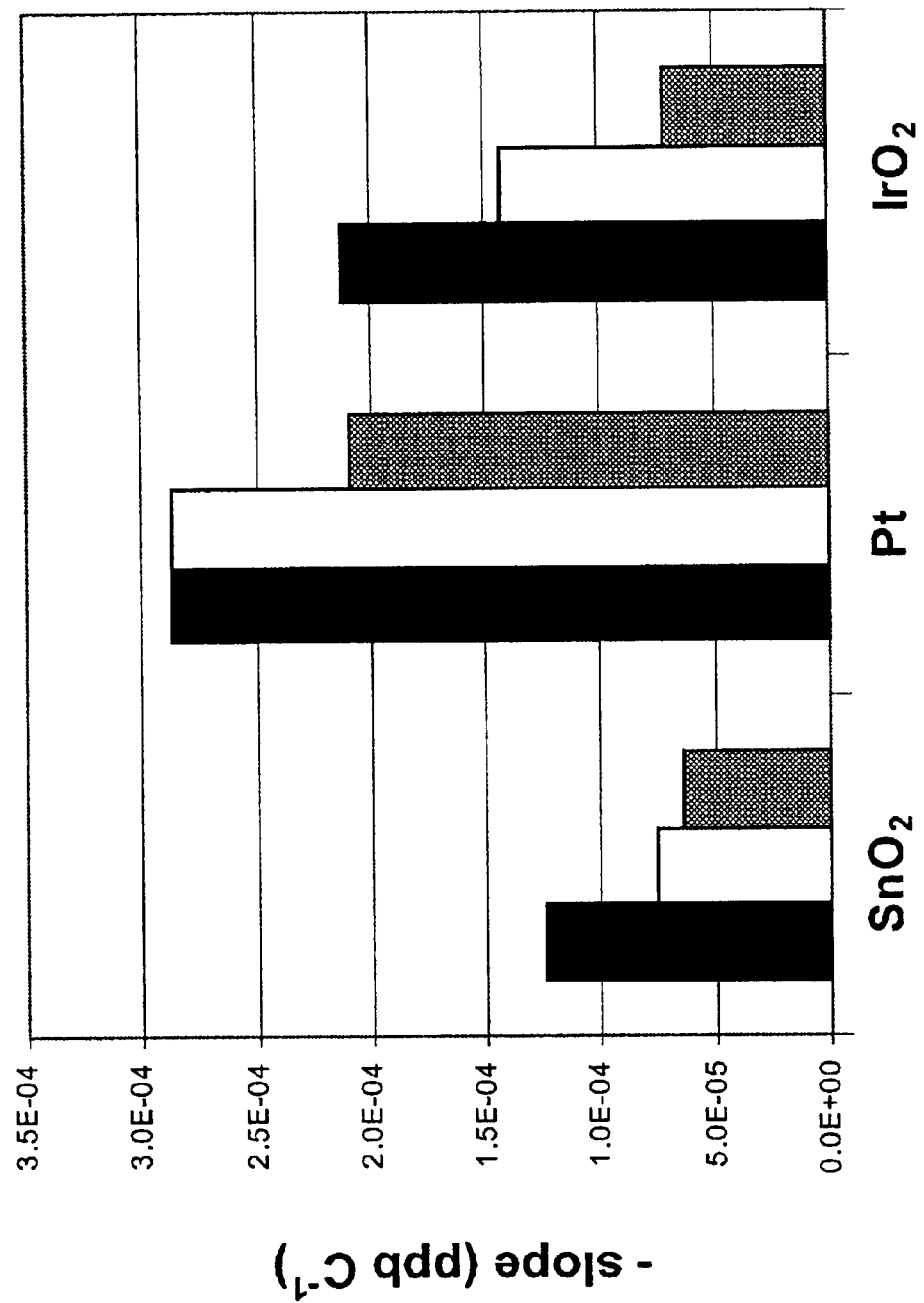
FIG. 7 is a graph of the efficiency of destruction of a mixture of m- and p-cresol by an embodiment of an electrochemical reactor of the invention, at current densities of 1.4 (white), 2.8 (black) and 5.6 (cross-hatched) mA/cm$^2$, using 3D foam anodes of either antimony-doped tin dioxide, platinum or tantalum-doped iridium dioxide.

Platinum, electrodeposited on a titanium substrate (see FIG. 4), exhibited high efficiency, together with high stability. Platinum was efficient in electrolyzing wastewater contaminated with phenol compounds, and is thus the preferred anode material. A summary of the evaluated efficiencies of the anode materials described in Table 1 is given in FIG. 6 and FIG. 7.

As well as platinum exemplified above, other metals such as palladium, rhodium, iridium or ruthenium, alone or in alloys with themselves or other suitable metals, can be used as the anode material.

Figure 5:
FIG. 5 shows the morphology of an antimony-doped tin dioxide ($SnO_2$) dimentionally-stable anode (DSA) coating.

Antimony-doped tin dioxide (see FIG. 5) coated anodes have been shown to be good at destroying organic compounds. However, it was the least efficient anode material that was tested in the reactor of the invention, most probably due to the presence of numerous other organic species in the wastewater to be treated.

Although tantalum-doped iridium dioxide-coated anodes showed a very good efficiency for destroying organic compounds, it was found that, over a period of time, the coating tends to spall off the anode substrate.

Although it is preferred that the tin dioxide and iridium dioxide coatings are doped as described above, they can each generally be doped with a dopant selected from Sb, Ta, F, Cl, Mo, W and Nb, and mixtures thereof, if required.

Known coating methods can be used to coat the anodes. The invention is augmented when the coating is uniform and homogeneous on the substrate.

The Cathode

A cathode is necessary to complete the electrical circuit and allow the electrochemical oxidation process to be possible. The cathode can be formed from a porous or 3D medium (foam, sponge, felt or mesh) and is preferably of a structure similar to that shown in FIGS. 2 and 3. Each porous cathode should have a pore opening value of up to 40 pores per linear inch (ppi), preferably 20 ppi, to allow liquid flow with minimal resistance. The cathode can also have other structures, such as a ring-like structure.

The cathode material can be nickel, nickel alloys, stainless steel or even titanium, or any other corrosion resistant material. Nickel is preferred because of its acceptable cost, stability in water and because it is commercially available in a porous-type structure such as found in Astro Met® materials (Astro Met, Cincinnati, Ohio).

EXAMPLES

Example 1

A solution from origin A, containing a total concentration of 7051 ppb of phenolic contaminant compounds, was treated in a reactor built with antimony-doped tin dioxide anodes for 72 hours. The anodic current density was 5.6 mA/cm², the flow rate was 8.2 l/minute, corresponding to a volume to treat of 6.8 liters of solution per volume liter of reactor, and the total applied current was 300 mA, corresponding to 76104 coulombs. After the treatment period, the final total concentration of the phenolic compounds went down to 26 ppb. The concentration decrease of each species is shown in Table 2.

TABLE 2

| Compound\charge (C) | 0 | 4925 | 24077 | 31738 | 50890 | 76104 |
|---|---|---|---|---|---|---|
| Phenol | 2600 | 1500 | 140 | 63 | 0 | 0 |
| 0-cresol | 51 | 24 | 0 | 0 | 0 | 0 |
| m-cresol | 600 | 270 | 20 | 10 | 0 | 0 |
| p-cresol | 3800 | 1100 | 71 | 44 | 30 | 26 |

Example 2

A solution from origin A, containing a total concentration of 7519 ppb of phenolic contaminant compounds, was treated in a reactor built with antimony-doped tin dioxide anodes for 48 hours. The anodic current density was 2.8 mA/cm$^2$, the flow rate was 8.2 l/min., corresponding to a volume to treat of 32.8 liters of solution per volume liter of reactor, and the total applied current was 600 mA, corresponding to 77760 coulombs. After the treatment period, the final total concentration of the phenolic compounds went down to 23 ppb. The concentration decrease of each species is shown in Table 3.

TABLE 3

| Compound\charge (C) | 0 | 5683 | 10543 | 38362 | 48752 | 77760 |
|---|---|---|---|---|---|---|
| Phenol | 2800 | 910 | 630 | 23 | 0 | 0 |
| 0-cresol | 39 | 12 | 0 | 0 | 0 | 0 |
| m-cresol | 480 | 210 | 140 | 0 | 0 | 0 |
| p-cresol | 4200 | 730 | 220 | 38 | 29 | 23 |

Example 3

A solution from origin B, containing a total concentration of 2783 ppb of phenolic contaminant compounds, was treated in a reactor built with antimony-doped tin dioxide anodes for 12 hours. The anodic current density was 1.4 mA/cm$^2$, the flow rate was 8.2 l/min., corresponding to a volume to treat of 32.8 liters of solution per volume liter of reactor, and the total applied current was 150 mA, corresponding to 6480 coulombs. After the treatment period, the final total concentration of the phenolic compounds went down to 710 ppb. The concentration decrease of each species is shown in Table 4.

TABLE 4

| Compound\charge (C) | 0 | 540 | 1060 | 3240 | 4860 | 6480 |
|---|---|---|---|---|---|---|
| Phenol | 1174 | 1298 | 1015 | 643 | 586 | 540 |
| 0-cresol | 25 | 13 | 13 | 9 | 8 | 7 |
| m- + p-cresol | 1219 | 762 | 593 | 385 | 259 | 163 |
| Total | 2418 | 2073 | 1621 | 1038 | 853 | 710 |

Example 4

A solution from origin B, containing a total concentration of 2374 ppb of phenolic contaminant compounds, was treated in a reactor built with tantalum-doped iridium dioxide anodes for 6 hours. The anodic current density was 5.6 mA/cm$^2$, the flow rate was 8.2 l/min., corresponding to a volume to treat of 32.8 liters of solution per volume liter of reactor, and the total applied current was 300 mA, corresponding to 6480 coulombs. After the treatment period, the final total concentration of the phenolic compounds went down to 922 ppb. The concentration decrease of each species is shown in Table 5.

TABLE 5

| Compound\charge (C) | 0 | 540 | 1080 | 2160 | 4320 | 6480 |
|---|---|---|---|---|---|---|
| Phenol | 822 | 772 | 754 | 665 | 486 | 358 |
| 0-cresol | 27 | 25 | 25 | 20 | 14 | 10 |
| m- + p-cresol | 1525 | 1454 | 1474 | 1176 | 801 | 554 |
| Total | 2374 | 2251 | 2253 | 1861 | 1301 | 922 |

Example 5

A solution from origin B, containing a total concentration of 2343 ppb of phenolic contaminant compounds, was treated in a reactor built with tantalum-doped iridium dioxide anodes for 12 hours. The anodic current density was 2.8 mA/cm$^2$, the flow rate was 8.2 l/min., corresponding to a volume to treat of 32.8 liters of solution per volume liter of reactor, and the total applied current was 150 mA, corresponding to 6480 coulombs. After the treatment period, the final total concentration of the phenolic compounds went down to 272 ppb. The concentration decrease of each species is shown in Table 6.

TABLE 6

| Compound\charge (C) | 0 | 540 | 1620 | 3330 | 4860 | 6480 |
|---|---|---|---|---|---|---|
| Phenol | 771 | 600 | 432 | 272 | 202 | 116 |
| 0-cresol | 28 | 17 | 14 | 8 | 8 | 6 |
| m- + p-cresol | 1545 | 951 | 733 | 380 | 298 | 151 |
| Total | 2343 | 1568 | 1179 | 660 | 509 | 272 |

Example 6

A solution from origin B, containing a total concentration of 2783 ppb of phenolic contaminant compounds, was treated in a reactor built with tantalum-doped iridium dioxide anodes for 12 hours. The anodic current density was 1.4 mA/cm$^2$ the flow rate was 8.2 l/min., corresponding to a volume to treat of 32.8 liters of solution per volume liter of reactor, and the total applied current was 75 mA, corresponding to 6480 coulombs. After the treatment period, the final total concentration of the phenolic compounds went down to 115 ppb. The concentration decrease of each species is shown in Table 7.

TABLE 7

| Compound\charge (C) | 0 | 270 | 540 | 1080 | 1620 | 6480 |
|---|---|---|---|---|---|---|
| Phenol | 788 | 704 | 524 | 380 | 285 | 37 |
| 0-cresol | 36 | 31 | 21 | 17 | 13 | 7 |
| m- + p-cresol | 1960 | 1551 | 1066 | 723 | 515 | 70 |
| Total | 2783 | 2286 | 1612 | 1121 | 813 | 115 |

Example 7

A solution from origin B, containing a total concentration of 1369 ppb of phenolic contaminant compounds, was treated in a reactor built with anodes made of platinum electroplated on sponge titanium substrate for 9 hours. The anodic current density was 5.6 mA/cm², the flow rate was 8.2 l/min., corresponding to a volume to treat of 32.8 liters of solution per volume liter of reactor, and the total applied current was 200 mA, corresponding to 6480 coulombs. After the treatment period, the final total concentration of the phenolic compounds went down to 48 ppb. The concentration decrease of each species is shown in Table 8.

TABLE 8

| Compound\charge (C) | 0 | 720 | 1440 | 3120 | 4560 | 6480 |
|---|---|---|---|---|---|---|
| Phenol | 359 | 286 | 253 | 173 | 119 | 16 |
| 0-cresol | 22 | 15 | 15 | 11 | 8 | 4 |
| m- + p-cresol | 988 | 690 | 595 | 373 | 250 | 29 |
| Total | 1369 | 990 | 863 | 557 | 377 | 48 |

Example 8

A solution from origin B, containing a total concentration of 1994 ppb of phenolic contaminant compounds, was treated in a reactor built with anodes made of platinum electroplated on foam titanium substrate for 18 hours. The anodic current density was 2.8 mA/cm², the flow rate was 8.2 l/min., corresponding to a volume to treat of 32.8 liters of solution per volume liter of reactor, and the total applied current was 100 mg, corresponding to 6480 coulombs. After the treatment period, the final total concentration of the phenolic compounds went down to 49 ppb. The concentration decrease of each species is shown in Table 9.

TABLE 9

| Compound\charge (C) | 0 | 360 | 1440 | 2880 | 4680 | 6480 |
|---|---|---|---|---|---|---|
| Phenol | 519 | 416 | 246 | 97 | 54 | 23 |
| 0-cresol | 29 | 20 | 13 | 6 | 3 | 2 |
| m- + p-cresol | 1445 | 1078 | 585 | 156 | 46 | 24 |
| Total | 1994 | 1514 | 844 | 259 | 103 | 49 |

Example 9

A solution from origin B, containing a total concentration of 1829 ppb of phenolic contaminant compounds, was treated in a reactor built with anodes made of platinum electroplated on foam titanium substrate for 18 hours. The anodic current density was 1.4 mA/cm², the flow rate was 8.2 l/min., corresponding to a volume to treat of 32.8 liters of solution per volume liter of reactor, and the total applied current was 50 mA, corresponding to 6480 coulombs. After the treatment period, the final total concentration of the phenolic compounds went down to 52 ppb. The concentration decrease of each species is shown in Table 10.

TABLE 10

| Compound\charge (C) | 0 | 360 | 720 | 1260 | 4320 | 6480 |
|---|---|---|---|---|---|---|
| Phenol | 479 | 375 | 255 | 137 | 23 | 29 |
| 0-cresol | 24 | 19 | 13 | 9 | 3 | 2 |
| m- + p-cresol | 1356 | 957 | 651 | 381 | 38 | 21 |
| Total | 1829 | 1351 | 919 | 528 | 64 | 52 |

We claim:

1. A flow-through electrochemical reactor for the treatment of wastewater from a debarking process the wastewater being forced through the reactor to lower organic compounds present in the wastewater to an environmentally acceptable level comprising:

a body having an internal chamber, and an inlet port and an outlet port in communication with said internal chamber, said inlet port and outlet port in sealing engagement with the internal chamber and adapted for sealed connection to an open recirculating system;

a series of sponge type metallic electrodes arranged in said internal chamber such that the wastewater flowing between said inlet port and said outlet port flows through openings of said sponge type metallic electrodes, at least one of said sponge type metallic electrodes having activity for the destruction of a target substance such as phenol and cresols;

said series of sponge type metallic electrodes having sufficient mechanical strength to withstand a flow of 60 liters/min, the series of electrodes comprising and alternating arrangement of cathodes and anodes there being at least three cathodes and two anodes the cathodes being negatively charged and the anodes being positively charged.

2. A flow-through electrochemical reactor according to claim 1, wherein the anodes comprises a substrate having a coating of antimony-doped tin oxide.

3. A flow-through electrochemical reactor according to claim 2, wherein the substrate is titanium.

4. A flow-through electrochemical reactor according to claim 3, wherein the anodes have a diameter of about 1.5 m and a thickness of about 0.5 cm.

5. A flow-through electrochemical reactor according to claim 1, wherein the cathodes are made from ferrous alloy.

6. A flow-through electrochemical reactor according to claim 1, wherein the body can hold the anodes and cathodes in the chamber such that they do not touch and cause short-circuits.

7. A flow-through electrochemical reactor according to claim 1, wherein the target substance is phenol, o-cresol, m-cresol or p-cresol.

8. The flow through electrochemical reactor according to claim 1 wherein said sponge type metallic electrodes have openings sufficient to provide enough hydrodynamic turbulence to promote oxidation activity and allow liquid flow with minimal resistance.

9. The flow through electrochemical reactor according to claim 1 wherein said sponge type metallic electrodes can withstand a high back flow water circulation for chamber clean up.

10. The flow through electrochemical reactor according to claim 1 having a current density of between 0.7 mA/cm2 and 70 mA/cm2 between respective cathodes and anodes.

11. The flow through electrochemical reactor according to claim 10 wherein for different target compounds zones of different current densities are formed.

12. The flow through electrochemical reactor according to claim 11 wherein the distance between the electrodes is changed to alter current densities.

* * * * *